(12) United States Patent
Stubbs et al.

(10) Patent No.: US 8,461,725 B1
(45) Date of Patent: Jun. 11, 2013

(54) IDENTIFICATION OF POWERED DEVICES FOR ENERGY SAVING

(75) Inventors: Mark A. Stubbs, Felton, CA (US); Manuel Roman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/248,923

(22) Filed: Sep. 29, 2011

Related U.S. Application Data

(63) Continuation of application No. 13/206,095, filed on Aug. 9, 2011.

(51) Int. Cl.
*H01H 9/54* (2006.01)
(52) U.S. Cl.
USPC .......................................................... 307/140

(58) Field of Classification Search
USPC .......................................................... 307/140
See application file for complete search history.

(56) References Cited

U.S. PATENT DOCUMENTS

| | | | | |
|---|---|---|---|---|
| 8,072,197 B2 * | 12/2011 | Tsou et al. | ..................... | 323/273 |
| 2010/0102051 A1 * | 4/2010 | Ebrom et al. | ................. | 219/520 |
| 2010/0256828 A1 * | 10/2010 | Wang | ............................. | 700/286 |
| 2010/0280674 A1 * | 11/2010 | Jalili | ............................. | 700/295 |

* cited by examiner

*Primary Examiner* — Robert L. Deberadinis
(74) *Attorney, Agent, or Firm* — Fish & Richardson P.C.

(57) ABSTRACT

A computer-implemented method for electronic content management includes physically exposing an electric appliance to a power providing device that is arranged to provide electrical power to various electric appliances, including the electric appliance; automatically obtaining an electronic identifier for the electric appliance using the power providing device; and transmitting the electronic identifier from the power providing device to a remote computing system.

20 Claims, 8 Drawing Sheets

IDENTIFICATION OF POWERED DEVICES FOR ENERGY SAVING

CROSS-REFERENCE TO RELATED APPLICATION

This application is a continuation of U.S. application Ser. No. 13/206,095, filed on Aug. 9, 2011, entitled "Identification Of Powered Devices for Energy Saving," the entire contents of which are hereby incorporated by reference.

TECHNICAL FIELD

This document relates generally to mechanisms for identifying the presence of an electrically-powered device, such as an electrical appliance, including by using a device, such as a power strip, that delivers electric power to the powered device. Such identification may allow more ready monitoring and control of electrical usage by the device.

BACKGROUND

The typical home or business is provided with a vast network of wiring to power electric devices in the home or business. Within a home or business, electric power typically starts at a set of circuit breakers, and then is distributed to a number of separate circuits. For example, it is common to have one or more switches near the entry or entries of a room to operate lights in the room, and also to provide a number of powered electric outlets around the periphery of a room, so that various electric appliances such as lamps, stereo equipment, kitchen or bath appliances, and the like can be plugged in and electrically powered.

Home automation systems may be provided to establish automatic control of such devices. For example, a user may plug switches into electric outlets and use computers or other controllers to turn electric power on or off to devices that are in turn plugged into the switches. One common home automation system is the widely-known X10 system and associated protocol for home automation. In addition, users may interpose power strips between an electric outlet and one or more appliances (e.g., as a boxy housing that rests against the wall in front of the outlet, or as a longer strip having a relatively large number of outlets that plugs into the wall outlet via a power cord), and those power strips may provide electronic output regarding the amount of power that passes through them.

SUMMARY

This document describes systems and techniques for identifying particular electricity-using devices (which are termed electric appliances here) at particular locations in an electric distribution system. In one example, registration devices may be distributed throughout the system, such as in the form of power strips that may be plugged into electric outlets in a home or business, and that may in turn deliver electricity to devices that may be in turn plugged into the power strips. The power strips may be provided with mechanisms for recording and registering the level of electricity used by any particular appliance.

In addition, the power strips may be provided with mechanisms for identifying particular appliances that are plugged into the strips. For example, an appliance may be provided with a radio-frequency identification (RFID) tag and the power strip may be provided with an RFID reader. Similarly, a near-field communication (NFC) chip, label, or tag (referred to herein as an NFC tag) may be built into the plugs of various electric appliances, and an NFC reader may be incorporated into a power strip at a position so that it is necessarily brought within a communication distance of the tag when the appliance is plugged in. In such a manner, when an appliance is plugged into a registration device, the registration device may provide energy to energize an RFID or NFC tag and may report an identifier for any located tag back to a central system, such as a home automation hub (which may be a free-standing dedicated device or may be implemented via an application on a personal computer). The power strip may subsequently report, to the hub, the amount of electricity used by the electric appliance.

Such systems and techniques may, in certain implementations, provide one or more advantages. For example, a power measuring device may be able to automatically identify which particular appliance it is delivering power to and may report the ID of the appliance to an energy management system, even as a user moves appliances around their office or home. As a result, the power usage of a particular appliance can be easily tracked. With such tracking, the usage can be reported to a central service that may compile power usage data from a wide variety of users and appliances, and may generate a variety of reports from such data, including reports that show comparative power usage by different users and different models of appliances. As a result, a power user may more readily identify mechanisms for reducing their electric power consumption, and a user shopping for appliances may more readily see what models of appliances have better electric performance in actual application.

In one aspect of the present disclosure, a computer-implemented method for electric management is disclosed. The method comprises physically exposing an electric appliance to a power-providing device that is arranged to provide electrical power to various electric appliances, including the electric appliance; automatically obtaining an identifier for the electric appliance using the power providing device; and transmitting the electronic identifier from the power-providing device to a remote computing system. The method can also include using the power providing device to monitor electric power usage by the electric appliance, and transmitting data that describes the electric power usage from the power-providing device to the remote computing system, along with information that identifies the electric appliance. In addition, physically exposing the electric appliance to the power providing device can comprise reading a near field communication (NFC) tag on the appliance with the power providing device, and reading the NFC tag can be triggered automatically by the power providing device determining that the appliance has been plugged into the power providing device. Moreover, the NFC tag can be located in or on an electrical plug of the appliance.

In certain implementations, the method can also include receiving, at the power providing device and from the computer system, a control signal, and in response, changing a flow of power to the electric appliance. Also, the power providing device can include one or more male electric plugs for making electrical connection with a standard electric outlet, and one or more female electric outlets for making electrical connection with electric plugs of the electric appliances. The method may further include physically exposing the power providing device to a sensor of a portable computing device, and registering the power providing device with the computer system in response to data input by a user of the portable computing device. In such a situation, the portable computing device can comprise a smartphone or tablet, and the user interacts with an energy management-related application installed by the user on the smartphone or tablet.

In another implementation, an electric power management device is disclosed that comprises a receptacle arranged to receive electric plugs from a plurality of different electric appliances, an electronic reader positioned to be physically exposed to an electric appliance and to obtain electronic identification information from the electric appliance, a power meter to measure electric power used by an appliance plugged into the receptacle and to generate data that characterizes the electric power use, and a transmitter to send the data to a computer system that is remote from the electric power device. The device can also comprise a switch to automatically control provision of electric power to an electric appliance plugged into the receptacle, in response to a control signal received from the computer system. The electronic reader may comprise a near field communication (NFC) further comprising a power meter arranged to measure electric power passed to the receptacle, and to provide data about the measured power to the transmitter. The device may also include an NFC tag arranged to provide an electronic identifier of the electric power device to an NFC reader.

In yet another implementation, an electric management system is disclosed that comprises one or more power supply devices arranged to pass electric power to electric appliances, the power supply devices provided with electronic readers to automatically obtain electronic identification information for appliances that receive power from the one or more power supply devices; and a computer hub arranged to communicate with the one or more of power supply devices to obtain data that identifies electric appliances that receive power from particular ones of the power supply devices and data that characterizes amounts of power received by particular appliances. The system may also comprise one or more near-field communication (NFC) sensors in the one or more power supply devices; and NFC tags in electric plugs of the appliances, wherein the NFC sensors are positioned so as to sense the NFC tags when the plugs are inserted into the power supply devices to obtain electric power.

The power supply devices can also include wireless transceivers arranged to communicate to the hub information about energy usage by appliances connected to respective ones of the power supply devices. In addition, a first power supply device can include a sensor to identify when an appliance is plugged into the first power supply device, and a controller to trigger reading of identification information from the appliance in response to sensing that the appliance is plugged into the power supply device. Moreover, the hub can be programmed to receive control commands from a user and to transmit control signals to the power supply devices in order to allows the user to remotely control electrical power provided to individual ones of the appliances. And the power supply devices can comprise electric power strips arranged to plug into electric wall outlets, or assemblies to serve as in-wall electric wall outlets, and that include female electric ports for mating with plugs of the appliances.

In certain aspects, the system further comprises one or more portable computing devices having wireless communication sensors for obtaining electronic identifiers form the appliances, and for communicating to the hub additional identifying information for the appliances received by portable computing devices.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally relates to components that homeowners or business owners may use to better track and/or control electric usage in their homes or businesses. Devices and methods that are discussed here may operate to automatically identify electricity-using appliances when they are plugged into an electric outlet. For example, appliances may be manufactured with near-field communication (NFC) tags applied in or on their electric plugs, and a power strip may include an NFC sensor that is located near its electrical outlets, so that the two are brought into close proximity of each other (i.e., within communication range). The NFC tag may be programmed with a unique identifier (ID), which the power strip can report to the central system along with subsequent energy usage data by the appliance.

Power strips and appliances may also be initially registered with a system so that data about the items can be known. For example, the location of a power strip within a home may be tracked so that a system may know where in the home the strip is located. Similarly, more complete identifying information for an appliance may be determined, such as the type of the appliance and its make and model number. Such information may be captured using a mobile computing device such as a smartphone. For example, the smartphone may include an NFC reader and may be brought in close proximity of an NFC tag in a power strip or appliance plug. A user of the smartphone may then invoke an energy management application to enter information about the particular device so as to register or enroll the device.

Figure 1:
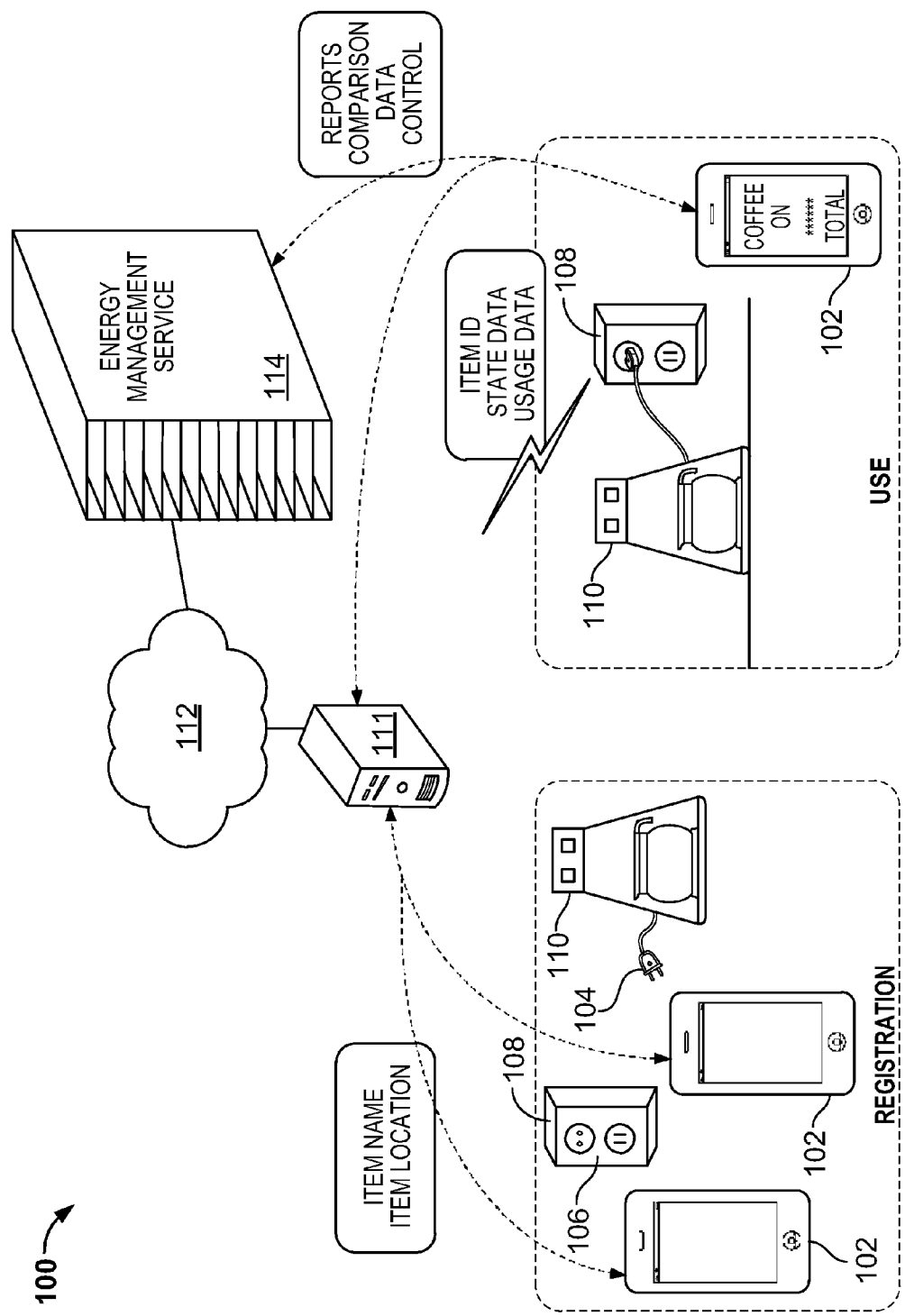
FIG. 1 is a conceptual flow diagram of a system for tracking electric consumption in a home or office.

FIG. 1 is a conceptual flow diagram of a system 100 for tracking electric consumption in a home or office. In general, the figure shows two phases in a process for tracking electric consumption—a registration phase and a use phase—as indicated by dashed boxes around each phase. The figure also shows manners in which portable devices—e.g., a power strip 108, a coffee maker 110 appliance, and a smartphone 102—communicate with each other and with a more central energy management system.

Referring now more particularly to portions of the figure, in a registration phase, a smartphone 102 is shown in two scenarios registering, respectively, a power strip 108 and a coffee maker 110, which is an example of an appliance for which a user may want to track energy usage. Other computing devices such as laptop or slate/tablet computers may also be used. With respect to the power strip 108, the smartphone 102 is being brought into close proximity of an NFC tag 106 on a surface of a housing of the power strip. A user of the smartphone 102 may do so after launching a home power management application that the user has previously installed on the smartphone 102, such as after downloading the application from an on-line application store. With the application executing, and upon sensing the NFC tag 106, the application may institute a user interaction on its display that requests that the user provide information about the power strip 108. For example, the user may initially identify that the power strip 108 is a power strip that passes power, as opposed to an appliance that is an end-user of the power. The user may then be prompted to identify where the power strip is located. For example, the user may be presented with a generic list of room names (e.g., kitchen, bath, bedroom) or may have previously identified all the rooms in her home, and may be presented with a list of those rooms. In this example, suppose that the power strip 108 is going to serve the coffee maker 110, so the user identifies its location as being in the kitchen.

In the second scenario, the smartphone 102 has been brought into close proximity of an NFC tag 104 in a plug of the coffee maker 110. Again, the energy management application may be executing already and upon being notified by an NFC manager on the smartphone 102, the application may prompt the user for meta data about the coffee maker 110. For example, the user may first identify that the tag scanned does relate to an appliance. The user may then navigate a series of menus to indicate that the appliance is a coffee maker (e.g., by first selecting a menu for kitchen appliances, and then selecting a coffee maker from a list of kitchen appliances). In certain instances, that may be enough information. In other instances, the user may go on and enter a make and model for the appliance, which, as discussed later, may permit the user (and other users) to compare the electric performance of her coffee maker against other coffee makers.

While the user can enter such information about the appliance via menus or by typing in the information, other techniques may also be used. For example, the NFC tag may itself encode an ID number that is associated in a central system with a particular make and model of a device. In such a situation, the tag may or may not further have a number for uniquely identifying the particular device, so that, for example, a user could differentiate electrical usage by two distinct devices in her home that are the same make and model (e.g., she may have identical coffee makers in her kitchen and in her bedroom). Alternatively, a user may capture such model-identifying information by capturing a QR Code or similar code (e.g., on a box in which the appliance came) using a digital camera on the smartphone 102 and submitting the image of the QR Code to a central service that translates QR Codes in a familiar manner. As yet another alternative, the user make capture a digital image of the appliance itself, and may submit the image to a central service that is dedicated to identifying physical objects that appear in photographs. Data received in return from such a system may then be submitted as the meta data that describes the make and model of the appliance (e.g., by auto-filling a form in the energy management application with such data and receiving manual user confirmation that the data is complete and accurate).

As shown by dotted arrows between the smartphone 102 and a power management hub 111, the registration information, such as an identification number from the NFC tag and information entered or otherwise obtained by a user of smartphone 102, may be provided for storage at the power management hub 111. The power management hub 111 may be a standalone unit or a personal computer programmed with an application for tracking and controlling energy usage via components such as power strip 108. Though shown as direct communications here, the communications between the smartphone 102 and power management hub 111 may be via pairing over a WiFi or similar LAN network, or via a network such as the Internet 112. The smartphone or similar portable device may also be physically docked (by wire or direct wireless connection) to the power management hub 111. In certain implementations, the smartphone or similar portable device may also act as the power management hub, and its portability (e.g., the fact that it may lose connection with the system for some periods) may be taken into account when programming the operation of components in the system. For example, power strips may be programmed to cache or store data if they attempt to upload it to a hub and the hub is not available, and may then attempt again to upload it at later times.

The power management hub 111 may store and index the information about power strip 108 and coffee maker 110, such as in one or more databases that correlate NFC ID numbers (or similar identification information) with meta data about particular devices. Example fields for such a database include room locations for power strips, and make and model information for appliances. The databases may also store information about energy usage, to be described in more detail next, including times at which a particular appliance began operating and ended operating, power draws at particular points during each such period, and average power draw over such periods.

The power management hub 111 may in turn send information through the Internet 112 to a central energy management service 114, and may receive certain data in return. The energy management service 114 may be a central hosted service that is offered to the public as a mechanism for helping track, compare, and control energy usage. For example, the energy management service 114 may receive all of the data stored by the power management hub 111 to serve as a back-up for the data, or may receive a summarized form of the data (e.g., average power draw for particular appliances or appliance models or types). The energy management service 114 may anonymize the data and may perform analysis on the data along with corresponding data from other registered users of the system 200. Such analysis may include aggregating usage data to identify trends in energy usage, average energy usage for particular appliance types or models of appliances, identifying the time of day or time of the week when particular appliance types are used, and the like. With the data anonymized, the data may be available for querying and reporting by third parties including the public. For example, members of the public may enter queries for personal or professional curiosity, such as whether curling irons are operated more minutes per day than are hair dryers or microwave ovens. More useful analysis may also be performed on the aggregated and anonymized data, such as by academic researchers attempting to determine how people use electric appliances, and to publish articles reporting on such findings or advocating for changes in the construction or use of such appliances in order to improve energy efficiency.

Referring now to the "use" phase (which may overlap with the "registration" phase where new devices are being added to a system while existing ones are being used), the coffee maker 110 is shown plugged into the power strip 108. The coffee maker 110 is operating, as shown by heat shimmering off the carafe. The power strip 108 is in turn communicating wirelessly with the power management hub 111, as shown by the lightning bolt. Such communication may occur over a dedicated short-range network in a facility (e.g., ZigBee) or via a WiFi or similar network.

The power strip 108 may include software or firmware for monitoring, accumulating, formatting, and transmitting data regarding such use. For example, the power strip 108 may be programmed to identify the start and end of electrical use by an appliance that is plugged into it, including by waiting a predetermined time after electric use ends in order to ensure that the stop in use is not merely momentary, and may then report the use to the power management hub 111. Alternatively or in addition, the power strip 108 may report usage data effectively continuously as the usage occurs. As shown in this example, the "use" data reported by the power strip may include an ID for the appliance (and the power strip 108 may be able to read NFC identifiers or other items at either of the two outlets and distinguish the two), data identifying the state of the appliance (e.g., whether it is drawing power or not, or is drawing power over a particular threshold so as to indicate that it is on rather than in a power-trickled sleep mode), and usage data that reports the amount of power used by the appliance.

Also in the "use" mode, the smartphone 102 may be involved again, but performing substantially different activities than it was performing in the "registration" mode. In particular, a user of the smartphone 102 may activate an energy management application on the smartphone 102 from anywhere in the world to monitor and control energy usage by appliances that have such functionality or are plugged into power strips that have such functionality. For example, the user may bring up a report that indicates a total amount of energy use in the user's home or business, along with a breakdown for energy use over a defined time period by particular appliances, where the appliances may have been identified using the techniques described here. The user may also control the operation of certain appliances, such as by identifying an appliance and indicating that it should be turned off or on. The energy management service 114 may forward such a command to the hub 211, such as by identifying a registered user account under which the smartphone 102 is logged in, and then identifying other devices, including hub 111, that may also be registered to the same account. The hub 111 may in turn identify where the appliance was last plugged in or may query various power strips within the system 200 in the user's home to learn where the appliance is plugged in, and may cause the appropriate power strip to provide power to, or discontinue power supply to, the relevant appliance.

As shown on the screen of smartphone 102, the user is reviewing a report that indicates that the coffee maker 110 is on, and has used 5 KWH of power over a defined time period of use. Also, a box along the line that connects smartphone 102 and energy management service 114 indicates example types of data that may pass between the two components, such as reports from the energy management service 114, comparison data which may be used to show how the user's appliances compare to those of other users, and control signals from the smartphone 102 that communicate actions that the user would like to perform with her appliances that are plugged into appropriately-provisioned power strips.

In this situation, control of the coffee maker 110 via the power strip 108, and automatic identification of the coffee maker 110 by the system 100 may have a number of advantages. For example, power draw of the coffee maker 110 may be identified without the need to provide power meter or communication capabilities in the coffee maker 110, and simply by providing a mechanism for electronically identifying the coffee maker, such as an NFC tag on the coffee maker 110 plug. As a result, a user may purchase the coffee maker 110 for less money, or may easily "upgrade" an existing appliance by adding an NFC tag to it. In addition, a single power strip 108 can serve a multitude of appliances, so that the cost of providing NFC sensor, control, monitoring, and communication circuitry and software/firmware may be less for a user (because a single power strip can serve multiple appliances).

Also, the enrollment and organization of an energy monitoring system may be simplified. For example, a user may enroll and provide information about devices, in certain implementations, simply by launching an application on a portable computing device (e.g., smartphone) that they already own, may simply swipe the computing device past a plug for an appliance, and may quickly provide information about the appliance in the manners discussed above. Thereafter, the device may be identified wherever it might be moved, by power strips reading the NFC ID for the appliance from the appliance plug, and such reading may be automated simply by the user plugging the appliance into an appropriately equipped power strip. That process may result in the power strip reading the ID, and sending it to the central system along with energy usage data for the appliance—even when the appliance has been moved from a different location and was previously using power from a different power strip.

The communication from a device may also occur by power line communication, which may be relevant when the power cord is not perfectly matched to the device (e.g., where a laptop computer may use many different power cords throughout a day). Such devices may have their own computing power and may able to report power usage themselves, however, whether over power lines or via a wireless network (WiFi) to a home server system or the like.

In addition, the power strip itself may communicate via power line communications or RF communications in addition to those discussed above. While "embedded" power strips that are mounted in the wall as part of an electrical outlet may be shielded from wireless communications, antennae may be integrated into the outlet faceplates so as to permit necessary wireless communications.

Figure 2A:
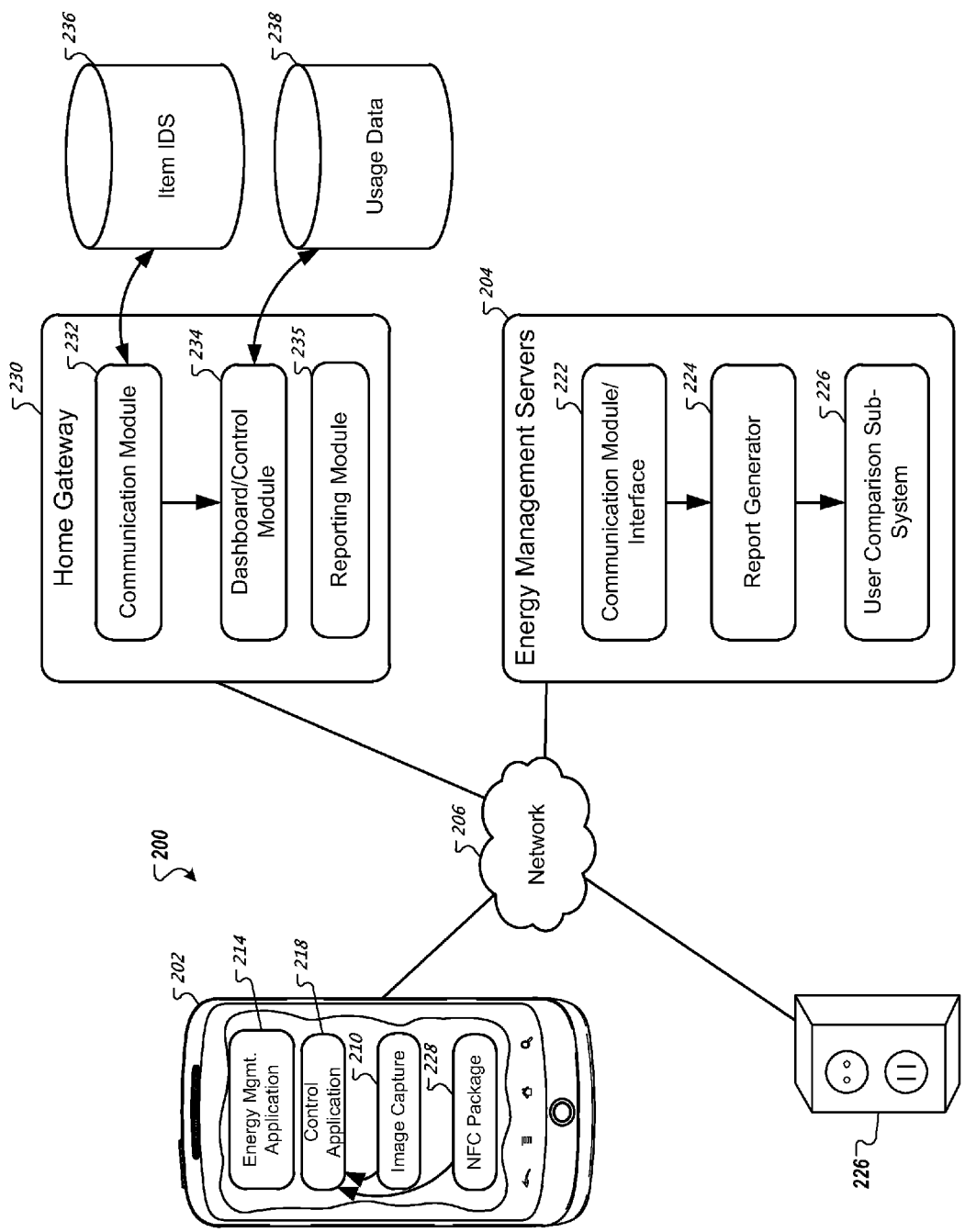
FIG. 2A is a block diagram of components of a system that tracks electric consumption via a power supply mechanism.

FIG. 2A is a block diagram of components of a system that tracks electric consumption via a power supply mechanism. In general, the components enable a user to monitor and control electric appliances, such as in a home or business operated by the user. The components shown here may, for instance, be employed in a system such as system 100 in FIG. 1.

The system 200 generally is made up of client-side devices and server-side systems that communicate through one or more networks 206 that may include the Internet. The devices include a smart phone 202 and a power strip 226. The smartphone 202 may be a standard computing device that is capable of executing built-in applications and applications that may be loaded onto the smartphone 202 by a user of the device. One such application is an energy management application 214 which may be part of a broader group of applications for monitoring energy usage and for home automation. The energy management application 214 may be programmed to show the user the status of energy use by components in the home or business, and may allow the user to control electric energy flow to the components. Other components on the smartphone 202 may assist a user in registering appliances, power strips, and other devices with the system 200. Such components may, for example, permit a user to expose a device to the smartphone 202 so that the smart phone 202 may obtain an identification number from an NFC tag, RFID tag, or other similar electronic identifying feature on or in the device. The tag may identify the device generally or uniquely, where general identification simply indicates the model or type of the device (e.g., like a traditional bar code), and unique identification identifies the device separately even from other devices from the same manufacturer and with the same model numbers. Unique identification may be helpful, for example, where a business or home has multiple copies of a particular device.

An NFC package 228 on the smartphone 202 may be used to conveniently capture an identifier from the various devices and provide it to other components over the network 206. The NFC package 228 may take a standard form, may be accessed by various applications on the smartphone 202 (e.g., e-commerce applications for point-of-sale use), and may obtain an identification number from a corresponding NFC tag, label, chip, or patch (collectively, "tags") that has been applied to a device and has been programmed with the number. In addition, an image capture module 210 may be used to obtain a visual digital image of the device, as described above. The image capture module 210 may include, for example, a standard camera on the smart phone 202 that is programmed to route image information to the energy management application 214 in certain circumstances.

A control application 218 may be programmed to interact with a user seeking to control electric power to devices, and to relay instructions from the user to other components to effectuate such desires of the user.

The smartphone 202 may interact with the power strip 226 in various manners such as those discussed above. The power strip 226 may also take a variety of forms, and in this example, is shown as a block-shaped housing that has two female receptacles on its front side for accepting plugs from various appliances and two male plugs on its back side (not shown) for plugging into a standard wall outlet. The power strip may also be integrated into a wall outlet, with its circuitry hidden inside a wall (and may present itself as an electric outlet or a switch that provides power to a light fixture or other appliance), and may also take a traditional form of a power strip having a number of electrical outlets in a row along a housing and a cord extending from the housing for engagement with an electrical outlet. The particular shape and form of the power strip is not critical, and the term is intended here to apply to various forms of devices that can receive supplied power and deliver it into a system, such as via standard electric outlets.

The energy management system 200 may be more generally managed by one or more central computer systems. Though the server side of the energy management system 200 may take many forms, for convenience and clarity, the energy management system 200 is shown here as involving two separate server subsystems. First, a home gateway 230 may communicate with the smartphone 202 in order to register certain devices, to subsequently provide information regarding the operation of the devices, and to provide signals for controlling energy flow to the devices. For example, when a user is executing the energy management application 214, she may select a control, such as an on-screen icon, in the energy management application 214 in order to have the smartphone 202 gather identifying information from a device, to run a report on the operation of the device, or to control the device (e.g., power strip 226). Where the smartphone 202 is used to scan a device, the components discussed above may cause the identifying information for the device to be transmitted form the smartphone 202 to a communication module 232 of the home gateway 230. The communication module 232 may then open a record for the particular device in an item IDs database 236, and may further populate the record if the user, via smartphone 202, provides additional information about the device, as described above with respect to FIG. 1. A dashboard/control module 234 in the home gateway 230 may further present code for a user interface that allows a user to control devices, and may forward commands regarding control of devices to power strip 226, such as commands to switch power supply to a particular device that is identified as being plugged into the power strip.

A reporting module 235 may respond to user requests about prior or current operation and control of devices, and may generate code (e.g., in HTML, XML, or similar form) for transmission to the smartphone 202 for displaying such reports, such as in manners discussed above. The reporting module 235 may generate reports by accessing a usage data database 238 that stores historical information about the use of devices in the system 200.

The energy management servers 204 may correspond, e.g., to the service 114 in FIG. 1. The servers 204 may be one or a number of server devices and may be housed in a large data center, and be formed as virtual servers by way of a virtualization process to maximize utilization of server assets in the data center system. The servers 204 may implement a number of components using, for example, software code that is stored on storage such as disk drives or Flash memory, and is retrieved and executed on one or more computer processors. For example, a communication module and interface 222 may interact with devices such as smartphone 202 to control user interaction with such devices. For example, a device may have previously logged in with a broader system of which the energy management servers 204 are a small part, and credentials provided in that log in may be used by the energy management servers 204 in order to identify a user account for the user and to supply appropriate information to the user. For example, when the user initiates energy management application 214, the application 214 may automatically call the servers 204 and show a display of the current status of various appliances in the user's house or business, such as a total amount of power being drawn by those appliances.

The communication module and interface 222 may draw information from a report generator 224 which may in turn obtain information from a user comparison sub-system 226. The report generator 224 may take raw data and format it for presentation to a user of a computer device. The comparison sub-system 226 may access anonymized usage data for multiple different users and may generate aggregated data that may in turn be used to generate reports via the report generator 224.

Figure 2B:
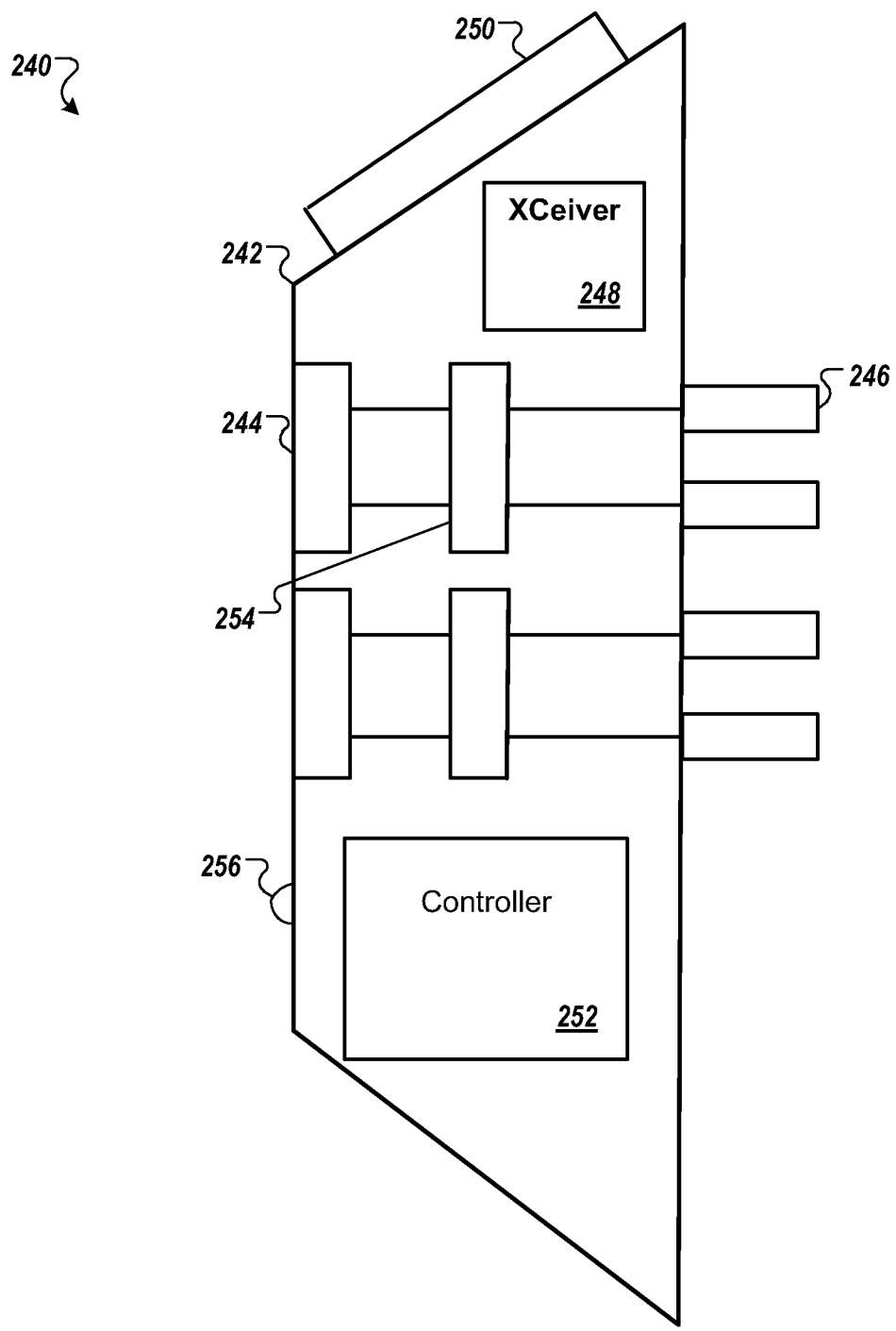
FIG. 2B shows an example power strip in side view.

FIG. 2B shows an example power strip 240 in side view. The power strip 240 takes the same physical form as power strip 226 in FIG. 2A, though other forms may also be used, and the particular form shown here is provided simply for clarity of example. The power strip 240 functions to monitor power use by devices that receive power through the power strip 240, and can also control power flow to such devices.

The power strip 240 is largely defined by a housing 242 within which (or on which) the components of the power strip 240 are located. For example, a pair of female electric receptacles 244 take a familiar form and are stacked vertically in a pair in this example, in a manner that echoes a traditional wall electric outlet. A corresponding pair of male plugs 246 is located on a back side of the housing and positioned to be inserted into a standard 110V single-gang electrical wall outlet. As discussed above, the power strip may be the in-wall outlet unit itself, an in-wall light switch for monitoring power to light fixtures, or an elongate strip of multiple outlets that may be plugged in with a cord and plug.

The power strip 240 includes a pair of switches 254—one for each of the pair of receptacles 244—that can be turned on or off via controller 252, which may be circuitry and software or firmware for responding to commands, such as commands received form a remote system, to switch power to appliances that are plugged into the receptacles 244. The controller may take a variety of forms, and may communicate with the remote system via wireless transceiver 248 and antenna 250. For example, a user of the system may send a command from a mobile computing device to the central system to turn on an appliance or to turn it off, the appliance may be previously switched on, and the switch 254 may be controlled, via a command received through the transceiver 247 as interpreted by the controller 252.

The controller 252 may also be programmed to monitor electric flow to the receptacles 244 and may report when it senses and measures such flow. For example, monitoring circuitry (e.g., a low value shunt resistor placed in series with the socket circuitry) may be placed adjacent the power wiring through the power strip 240 and may sense when current is flowing through the power strip. The circuitry may present data to the controller 252 regarding the flow of current, and the controller may convert such data to a useful representation of such power draw, such as KWH of electricity usage. The controller 252 may store such data, such as by accumulating data on a total amount of power usage during one session (e.g., one cycle of turning the appliance on and then off). The controller 252 may then transmit the data to a central system via transceiver 248.

The power strip 240 may also include an NFC sensor 230 at or near the receptacles 244 for obtaining identifying information encoded on an NFC tag that may be placed in or on an electrical plug placed in one of the receptacles 244. The operation of the NFC sensor may be triggered by a switch in the power strip 240 recognizing when a plug has been inserted into the power strip, which may then activate the sensor and also activate the controller 252 to obtain and store or transmit a sensed identifier for the plug/appliance. In certain implementations, electric flow through the power strip 240 may interfere with the ability to read an electronic identification device such as an NFC tag—as such, the controller 252 may cause power flow to be switched off temporarily while identification for the appliance is being obtained.

The power strip 240 may also have an NFC tag 256 of its own installed so that it can be identified. For example, the NFC tag 256 may be programmed with a unique or semi-unique identifying number, which may be read from a mobile computing device, such as part of a registration process like that discussed above with respect to FIG. 1. The NFC tag 256 may be positioned so as not to confuse the NFC sensor on the power strip 240, however.

In this manner, the power strip 240 may be installed in an in-wall outlet box, or may be inserted into an existing wall outlet. Upon installing it in this manner, a user may scan the NFC tag 256 with a portable computing device in the manners discussed above and may enter information about the power strip 240, such as by providing a name to the power strip 240, an identification of the number of outlets in the strip, and a location of the power strip 240. Around the same time, the user may place NFC tags on plugs of the user's appliances or may purchase appliances that already have NFC tags built into their plugs. The user may then employ the portable computing device, and its associated energy management application, to register those appliances. For example, the user may launch the application, scan an appliance tag, identify that the scanned tag relates to an energy using device (an appliance) rather than an energy passing device (a power strip), and may then identify the make and model of the appliance. The user in this example need not identify a location of the appliance or where the appliance is plugged in, however. The subsequent actions by the user for tracking power usage will simply involve plugging the appliances in and using them in a normal manner. For example, if the user tagged a curling iron, electric razor, and blow dryer, the user need only plug them individually into a power strip in their bathroom that is capable of monitoring and of reporting an ID for the particular appliances along with energy usage data.

Subsequently, the user can track energy usage of the appliances. For example, the user may plot an energy usage profile for the electric razor, and may find that it is drawing electricity throughout a day even though it requires only a few minutes to recharge each day. The user may access such data remotely, such as at work, and may choose to shut off a receptacle 244 that is currently providing current to the electric razor charger. The user may also perform a comparison of the average electric use of the razor compared to razors of other people, both in terms of average energy draw to determine whether they could purchase a more efficient razor, and in terms of total power drawn.

In certain examples, the total power draw may provide a user with information that the user would not obtain from a device's average power draw. For example, a user may plug a central vacuum system into a power strip and may learn that his total power draw is much larger than that of other users who have the same system. From such information, the user might conclude that he cleans his house too often, and may use the vacuum less. In other instances, the system can store data indicating the frequency with which certain devices are used and/or the frequency of use, for similar such comparisons. For example, anonymized data may be used by a social scientist in a study of how frequently the average person uses a coffee maker, or similar point of interest to the researcher.

Figure 3A:
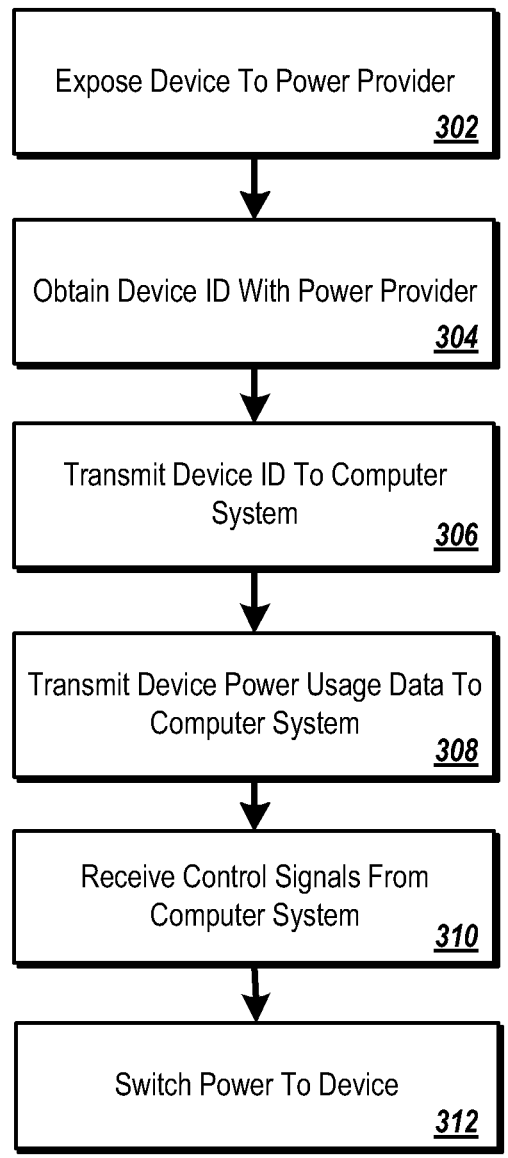
FIG. 3A is a flow diagram of actions for tracking and controlling energy use by an appliance.

FIG. 3A is a flow diagram of a process for tracking and controlling energy use by an appliance. In general, the process shown here involves automatically identifying the location of an appliance by virtue of it being plugged into a power provider (e.g., a properly provisioned electric outlet).

The process begins at box 302, where a device that uses electric power is exposed to a provider of electric power. Such exposure may occur by a power plug of the device being inserted into a receptacle of the power provider, such as in an electric outlet or other form of power strip. Moreover, the exposure may occur in conjunction with the use of an inductive charging device such as a charging pad for consumer electronics. In such a situation, when a device is laid on the pad, charging of the device may begin, and an identifier of the consumer device may be obtained by the pad, and/or an identifier of the pad may be obtained by the consumer device. Either the device or the pad may then report, to a central energy management system, information about power drawn by the device.

The exposure may result in the power provider obtaining an identification number (which may be made up of alphanumeric characters) from a NFC tag, where the identification number may be used to generally or uniquely identify the tag (box 304). Alternatively, an RFID tag, which can generally be read form a further distance than can an NFC tag, may be placed in a plug or in an appliance, and an RFID sensor in the power provider may identify the RFID tag, and in turn may identify the appliance. An NFC tag in particular may be beneficial because its range of action is short enough that a system will not register false positives when there are multiple appliances in close proximity of each other.

At box 306, the power provider transmits the device ID to a central computer system. Such transmission may occur via a wireless transceiver in the power provider, and to a home-based gateway, which may be stand-alone or part of a user's computer system. The device may then begin drawing power, and the power provider may track the power usage. At box 308, then, the power provider transmits device power usage data to the central computer system. The power provider may have previously reported which receptacle the relevant appliance was plugged into, and may subsequently report that receptacle along with electric usage data, or it may report the ID for the particular appliance that is using the electricity. By providing such identifiers, a power provider that has multiple outlets can identify which of the outlets, and thus which of the appliances that are plugged into various of the outlets, is drawing the electric power.

The power provider may cycle through such operations as necessary. For example, additional appliances may be plugged into the power provider, and certain appliances may be unplugged. The new appliances may thus be registered (though the unplugged appliances need not necessarily be unregistered, since the particular receptacle will be reassigned automatically when another appliance is plugged into it). Also, various ones of the prior or new appliances may turn of or off, and their electric consumption may be tracked and reported back from the power provider to the central energy management system.

In another mode of operation, at box 310, the power provider receives one or more control signals from a remote computer system. Such signals may request that the power provider report in usage and registration information, or may request that the power provider change its operation in some manner. As one example, the request may be to have power to a particular receptacle stopped or opened up. Thus, at box 312, the process switches power to the device at the particular receptacle, such as by stopping power to it. In this manner, an appliance may be tracked and controlled at an outlet into which it has been plugged, without the user having to perform particular steps to enroll the appliance at that location.

Figure 3B:
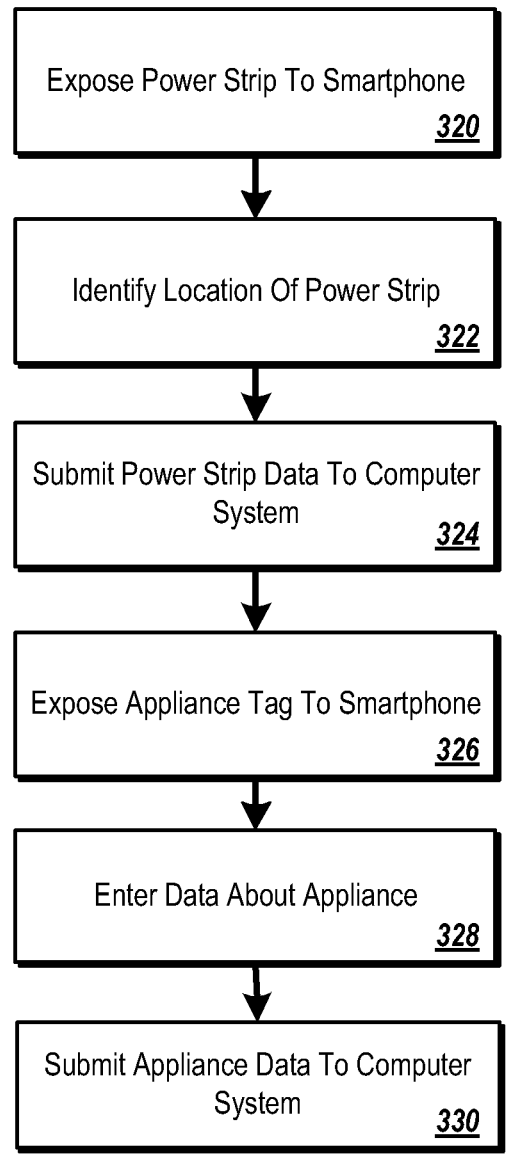
FIG. 3B is a flow diagram of actions for registering power strips and appliances with an energy management system.

FIG. 3B is a flow diagram of a process for registering power strips and appliances with an energy management system. In general, the process shown here involves an example registration process by which various devices may become registered with a home automation and energy management system, so as to permit the sort of automatic tracking and reporting discussed above, including with respect to FIG. 3A. Thus, the process shown here may precede the process shown in FIG. 3A, though the processes may be circular, in that each may occur many times during the use of a system, and they may be used in alternating time-wise periods, and or can also be carried out simultaneously.

The process begins at box 320, where a user exposes a power strip to a smartphone owned by the user and that is logged into the user's account with an on-line hosted service provider. Such exposure may occur by the user placing the smartphone in close proximity of the power strip, such as by placing the back of the smartphone against an electric outlet on the power strip. At box 322, the process identifies a location of the power strip. For example, an application executing on the smartphone may ask the user to type into a field on a form, a room in a house in which the power strip is currently located. Such information may be stored and presented when a user wishes to review energy use information for, or to control electric appliances receiving power from the power strip, among others. For example, a user may wish to see all energy use data for power strips currently located in the user's kitchen, even when the user has moved the power strips from time-to-time (and re-registered them in each new location). In other implementations, the location of the power strip would not need to be tracked, and usage of particular appliances can be tracked without needing to know the location in which they are plugged in.

At box 324, power strip data is submitted to a central computer system. The central computer system may be the same system with which the devices were registered in the process of FIG. 3A. At this stage, the data submitted to the central computer system may simply be registration data that identifies the power strip to the central system so that, for example, the central system may know to issue control signals to the power strip.

At box 326, an appliance tag is exposed to a smartphone. Such exposure may occur in a manner similar to that for the power strip, such as by positioning an NFC scanner close to an NFC tag on the appliance (e.g., on a power cord of the appliance). And at box 328, data about the appliance is collected. Such data may be collected from a central service, such as by submitting an ID number read off the appliance to a central service that catalogues ID numbers in correlation to make and model information for the appliances (similar to a manner in which bar codes are correlated to particular products). Alternatively, a user may be prompted to fill out a form including information about the appliance, such as by typing in make and model information, or selecting values for such fields from drop down menus. The user can also take one or more digital images of the appliance and/or its packaging from which the appliance can be identified. For example, a bar code or QR code on a box in which the appliance was obtained may be captured and the image submitted to a central server system that may return make and model information according to an acceptable API, where the make and model information may then be forwarded to the home gateway. In a similar manner, the smartphone may capture an image of the appliance itself, may submit the image to an Internet-connected service, and may receive in return text that identifies the appliance (e.g., type, make, and model). The smartphone may then submit such information to a home gateway.

At box 330, data about energy usage by the appliance may be submitted to the central computer system, such as the home gateway. Such submission of data to the central computer system may be scheduled in various manners. For example, the power strip may be programmed to submit data at fixed periods such as once each hour or day. Alternatively, the power strip may be programmed to submit data only when an appliance is using power. As one example, the power strip may compile usage data while an appliance is drawing power, and may package up and submit the data once the appliance has stopped drawing power for a predetermined time period, under an assumption that a break in power use will distinguish the usage from a subsequent use of an appliance.

Figure 4:
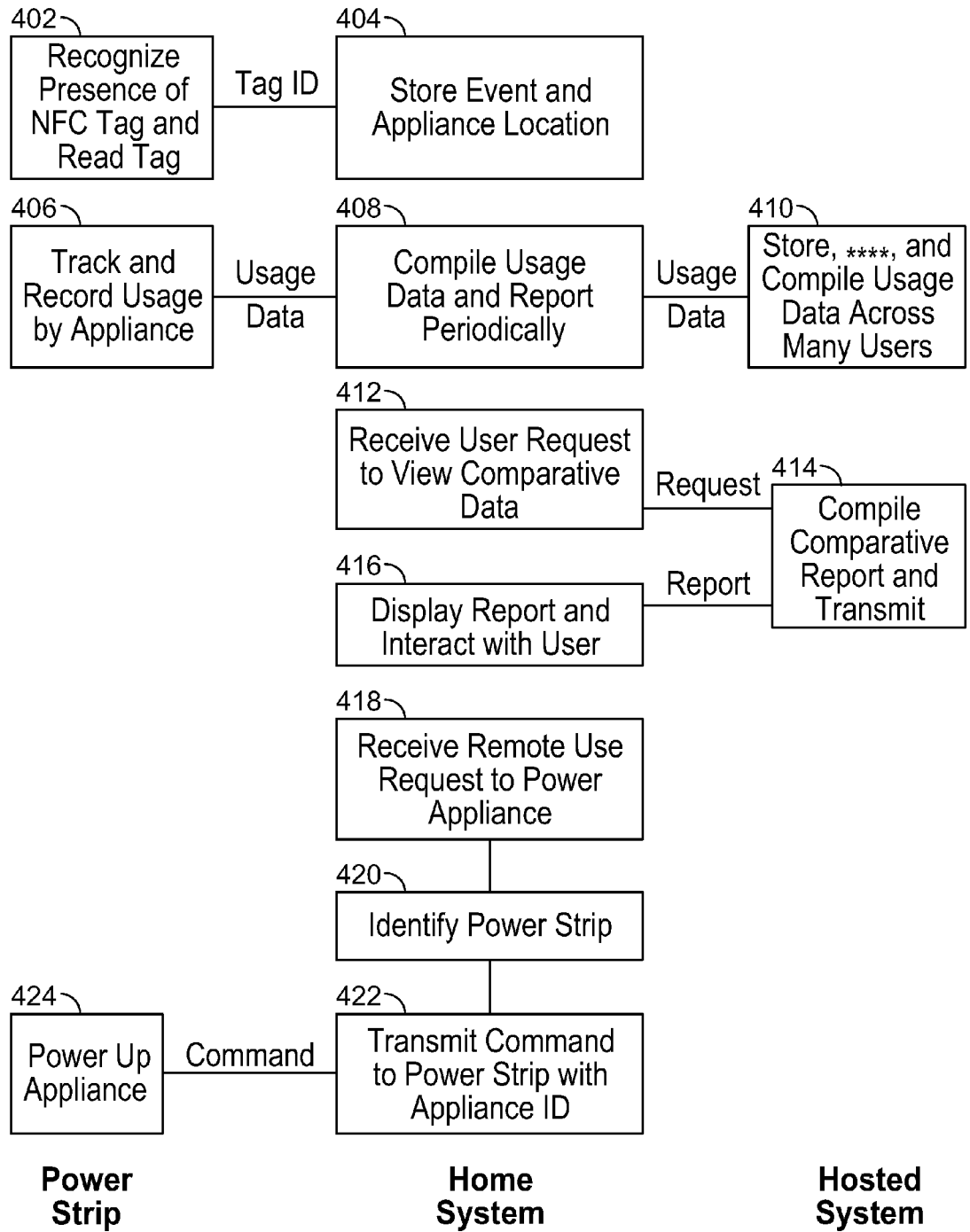
FIG. 4 is an activity diagram of operations performed in tracking and controlling energy in appliances.

FIG. 4 is an activity diagram of operations performed in tracking and controlling energy in appliances. The operations shown here are similar to those shown in FIGS. 3A and 3B, but particular actions are shown here occurring on particular components in the system to more clearly indicate one example for how particular operations can be carried out. In this example, the main components are a power strip like those discussed above, a home system (e.g., a home gateway as a standalone device or an application running on a home personal computer), and a hosted system (e.g., running various hosted computer services including energy management services).

The process begins here at box 402, where a power strip recognizes the presence of an NFC tag in its vicinity and reads an identification number off the tag. The tag may be on a plug for an appliance, and the recognizing may be triggered simply by the tag being brought in close proximity to an NFC reader in the power strip, or by the power strip recognizing, via a power draw on the power strip, that a device has been plugged into the power strip.

The power strip may then submit the identifying information for the device to the home system, which in turn stores the fact that the device was plugged into the power strip, and the location at which the device is plugged in (e.g., which room in the house it was plugged in at).

Later, at box 406, the device begins using electricity that it receives through the power strip, and the power strip tracks and records such usage. For example, the power strip may measure the current every several seconds and may then compute basic information from such measurements (e.g., total power used) or may simply store the basic measured data. At some point, the power strip submits the usage data for the device to the home system. For example, when the device has stopped drawing power for more than 10 seconds, the power strip may submit all stored usage data for the current session of power use. The particular determination of when to identify power usage as being part of a single session can be based on historical operation of a device or on data provided by observing multiple devices or classes of devices. For example, if a system observes that a particular device is turned on and off frequently (e.g., via a thermostat that may cycle a curling iron or similar heating or cooling device on and off), it may determine that a usage session should require a "shut off" period in excess of the typical observed cycling time. Also, the central system may be programmed in advance to instruct power strips or other power providers to register an event or session only after a period of X time of inactivity.

The home system compiles usage data at box 408. Such compilation may occur for one or more appliances for which usage data has been reported by one or more power strips. The home server may also report certain usage data to the hosted system, which may in turn store the data for the user, anonymize the data, and compile anonymized usage data across multiple users (box 410). The compilation and aggregation of usage data may take a variety of forms. For example, average power usage for particular types of devices or makes/models of devices may be computed so as to be accessible to various users who want to be able to review and compare device efficiency. Also, users may want to review energy usage of other users who may be considered model energy users or average energy users, just as users of financial sites such as mint.com share spending information.

At box 412, the home system receives a request from its user to review such comparative data. Such a request may come when the user launches an energy management application that has a console feature, on a personal computer connected to or operating the home system, or from a smartphone or other similar mobile device. The user may want to know, for example, how her usage of a particular appliance compares to usage by others. The home system may thus request such data from the hosted system, which may in turn compile the information in various manners and transmit it back to the home system (box 414). The home system may in turn display a report that shows the comparative information, and may interact with the user, such as by the user seeking to drill down in certain data or to retrieve additional and different data from the hosted system (box 416).

At box 418, a new interaction between the user and the home system begins. In this example, the user makes a request, such as from their smartphone, to power one of the appliances that is plugged into an appropriately-provisioned power strip. For example, the user may wish to start a sauna operating as the user leaves work at the end of a day, so that the sauna will be preheated. To that end, the user may have purchased an appropriate power strip, plugged a heating unit for the sauna into it, and registered the power strip and/or sauna in the manners discussed above. The request from the user in this example, may simply identify the sauna as the appliance to be switched. At box 420, the home system identifies which power strip is implicated by the request—i.e., which strip the sauna heater unit is plugged into. The home system then transmits a command to the appropriate power strip with an ID for the appliance so that the power strip turns on, e.g., the sauna. The appliance ID may be useful where the power strip includes multiple different switched outlets, and the system needs to tell the power strip which outlet to energize (see box 424).

By this approach, a system may readily permit for the monitoring and control of electric appliances in a home or business setting. The appliances may be "followed" as they move about a home, and their energy usage may be monitored as they are moved from one electrical outlet or other form of power strip to another. Such device-by-device tracking may enable the capture of data that can provide a more complete picture of the usage of a device, so that better analysis can be made of such usage, both at the level of a single user, and across a large number of users. As a result, the main user or the other users may save energy and better manage their electric consumption.

Though much of the discussion above has related to particular appliances, the monitoring and control discussed here may also be grouped. For example, a user can define certain control modes for their home, such as "working," "sleeping," "home," "away" and the like, and particular appliances can be controlled to be turned on or off using macros or similar features. For example, in an "away" mode, most lights may be turned off, as may an electric blanket and lamp that are plugged into a power strip outlet near the user's bedside.

Figure 5:
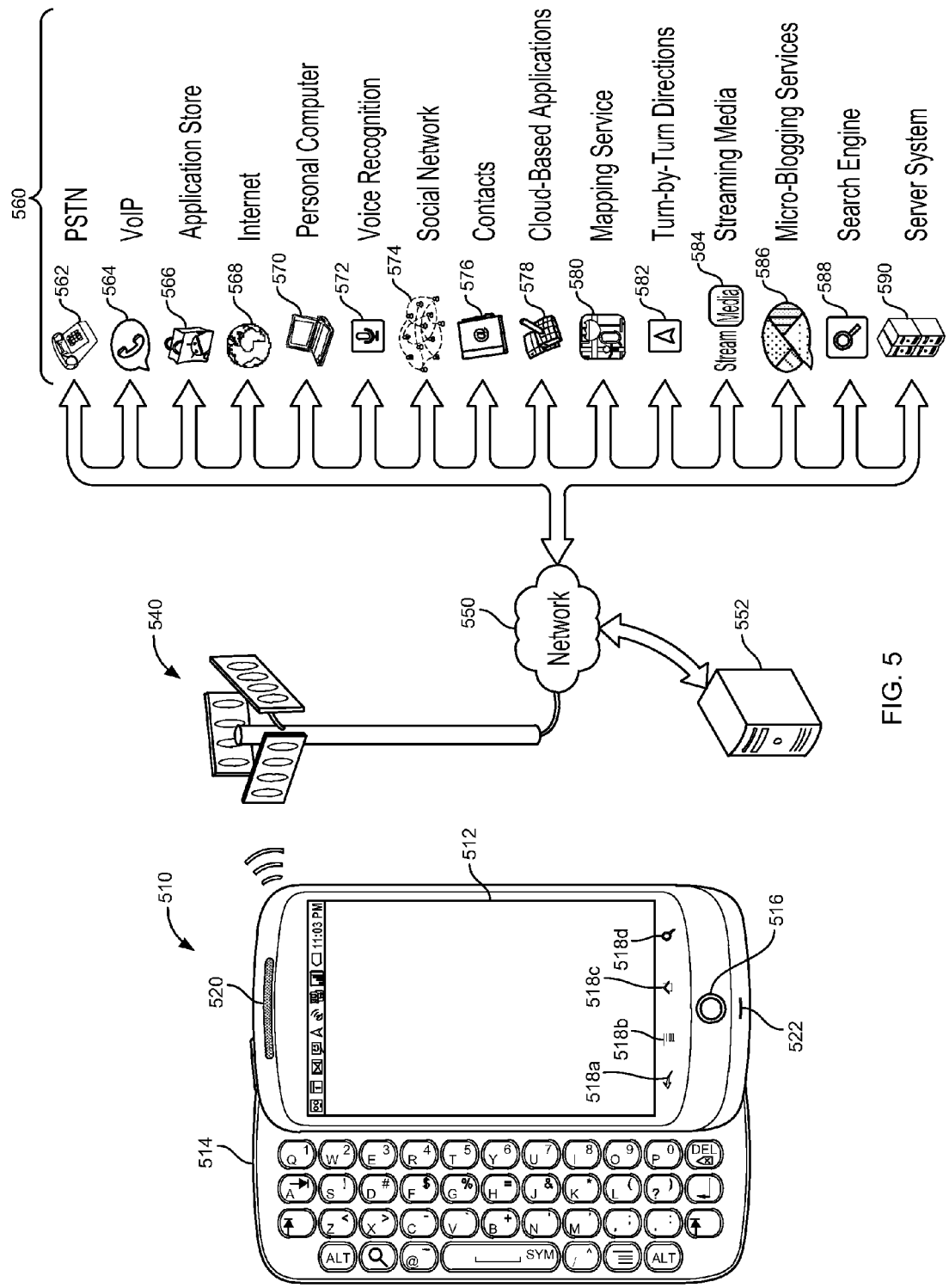
FIG. 5 is a conceptual diagram of a system that may be used to implement the systems and methods described in this document.

Referring now to FIG. 5, a conceptual diagram of a system that may be used to implement the systems and methods described in this document is illustrated. Mobile computing device 510 can wirelessly communicate with base station 540, which can provide the mobile computing device wireless access to numerous services 560 through a network 550.

In this illustration, the mobile computing device 510 is depicted as a handheld mobile telephone (e.g., a smartphone or an application telephone) that includes a touchscreen display device 512 for presenting content to a user of the mobile computing device 510. The mobile computing device 510 includes various input devices (e.g., keyboard 514 and touchscreen display device 512) for receiving user-input that influences the operation of the mobile computing device 510. In further implementations, the mobile computing device 510 may be a laptop computer, a tablet computer, a personal digital assistant, an embedded system (e.g., a car navigation system), a desktop computer, or a computerized workstation.

The mobile computing device 510 may include various visual, auditory, and tactile user-output mechanisms. An example visual output mechanism is display device 512, which can visually display video, graphics, images, and text that combine to provide a visible user interface. For example, the display device 512 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 512). Further, the mobile computing device 510 may include one or more speakers 520 that convert an electrical signal into sound, for example, music, an audible alert, or voice of an individual in a telephone call.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a trackpad enables the user to supply directional and rate of rotation information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 514. User-selection of the button may invoke the pre-defined action.

In some examples, the operating system provides a "desktop" user interface that is displayed upon turning on the mobile computing device 510, activating the mobile computing device 510 from a sleep state, upon "unlocking" the mobile computing device 510, or upon receiving user-selection of the "home" button 518c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 510 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 510 may include other application modules and hardware. A call handling unit may receive an indication of an incoming telephone call and provide a user capabilities to answer the incoming telephone call. A media player may allow a user to listen to music or play movies that are stored in local memory of the mobile computing device 510. The mobile telephone 510 may include a digital camera sensor, and corresponding image and video capture and editing software. An internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., Ethernet, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computerized devices that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing devices associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call with a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL webmail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 6:
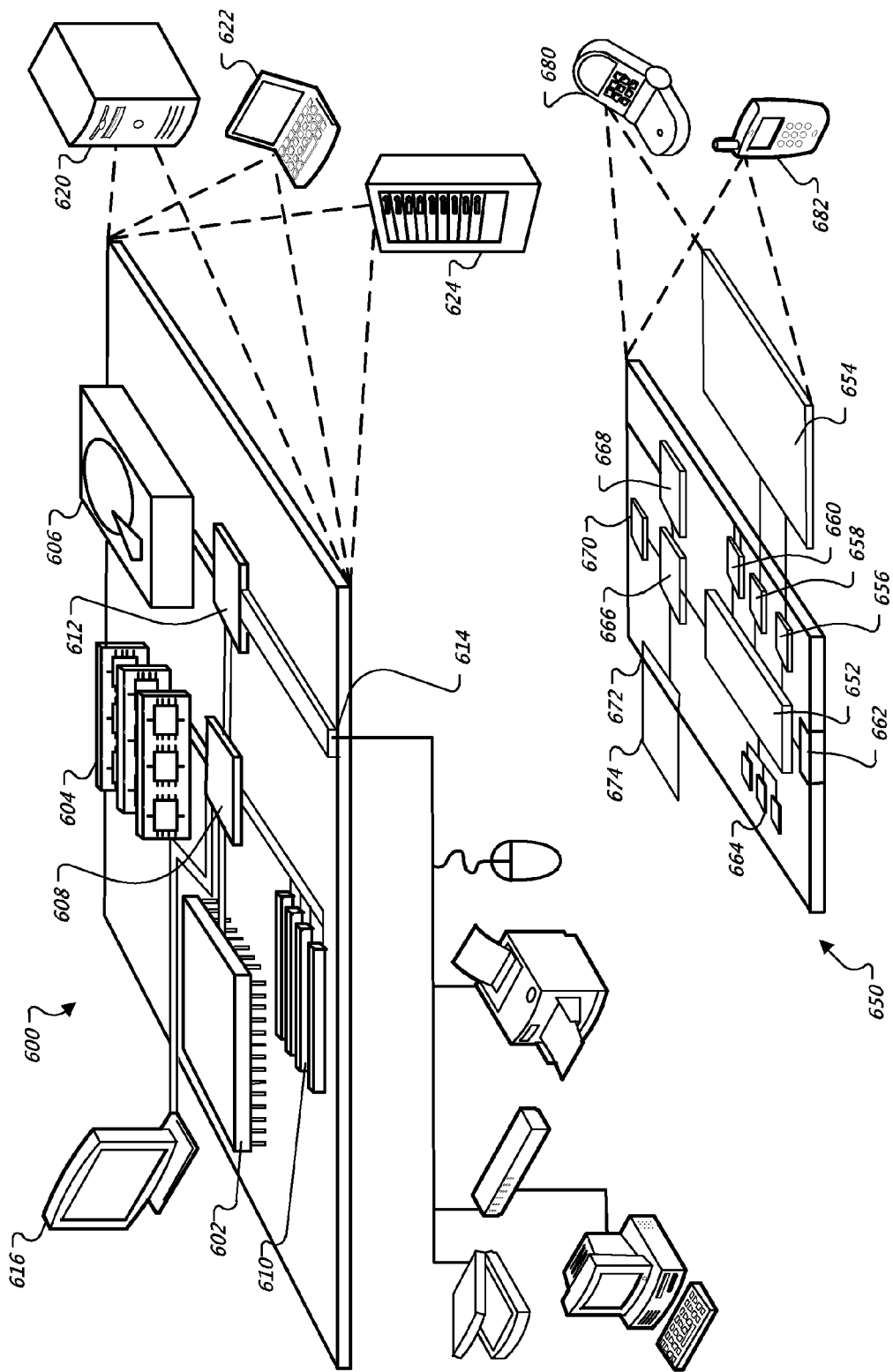
FIG. 6 shows an example of a computer device and a mobile computer device that can be used to implement the techniques described herein.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 706. The memory 604 and storage device 606 are forms of tangible, non-transitory media providing some permanence of storage, as contrasted with propagated signals that are transitory in character. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 610 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 652.

Device 650 may communicate wirelessly through communication interface 766, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for electric management, the method comprising:
   physically exposing an electric appliance to a power-providing device that is arranged to provide electrical power to various electric appliances, including the electric appliance;
   automatically obtaining from a structure of the electric appliance an electronic identifier for the electric appliance using the power providing device;
   transmitting the electronic identifier from the power-providing device to a remote computing system;
   measuring electrical usage by one or more appliances through the power-providing device;
   storing data that characterizes the electrical usage over a period of time at the power providing device; and
   transmitting the data that characterizes the electrical usage from the power-providing device to the remote computing system upon identifying an occurrence of a predetermined event.

2. The computer-implemented method of claim 1, further comprising:
   using the power providing device to monitor electric power usage by the electric appliance; and
   transmitting data that describes the electric power usage from the power-providing device to the remote computing system, along with information that identifies the electric appliance.

3. The computer-implemented method of claim 1, wherein physically exposing the electric appliance to the power providing device comprises reading a near field communication (NFC) tag on the appliance with the power providing device.

4. The computer-implemented method of claim 1, wherein the occurrence of the predetermined event is identified by determining that power flow through the power-providing device has ceased for a determine time period.

5. The computer-implemented method of claim 1, wherein the occurrence of the predetermined event is identified by determining that a defined time period has expired.

6. The computer-implemented method of claim 1, further comprising receiving, at the power providing device and from the computer system, a control signal, and in response, changing a flow of power to the electric appliance.

7. The computer-implemented method of claim 1, wherein the power providing device includes one or more male electric plugs for making electrical connection with a standard electric outlet, and one or more female electric outlets for making electrical connection with electric plugs of the electric appliances.

8. The computer-implemented method of claim 1, further comprising physically exposing the power providing device to a sensor of a portable computing device, and registering the power providing device with the computer system in response to data input by a user of the portable computing device.

9. The computer-implemented method of claim 8, wherein the portable computing device comprises a smartphone or tablet, and the user interacts with an energy management-related application installed by the user on the smartphone or tablet.

10. A electric power management device, comprising:
    a receptacle arranged to receive electric plugs from a plurality of different electric appliances;
    an electronic reader positioned to be physically exposed to an electric appliance and to obtain, from a structure of the electronic appliance, electronic identification information from the electric appliance;
    a power meter to measure electric power used by an appliance plugged into the receptacle and to generate data that characterizes the electric power usage;
    a memory element to store the data that characterizes the electric power usage over a period of time; and
    a transmitter to send the data that characterizes the electric power usage to a computer system that is remote from the electric power management device upon an occurrence of a predetermined event.

11. The electric power device of claim 10, further comprising a switch to automatically control provision of electric power to an electric appliance plugged into the receptacle, in response to a control signal received from the computer system.

12. The electric power device of claim 10, wherein the occurrence of the predetermined event is identified by determining that power flow through the power meter has ceased for a determine time period.

13. The electric power device of claim 10, wherein the occurrence of the predetermined event is identified by determining that a defined time period has expired.

14. An electric management system, comprising:
    one or more power supply devices arranged to pass electric power to electric appliances, the power supply devices each provided with an electronic reader, an electric power strip, and a transmitter, wherein the electronic reader is arranged and configured to automatically obtain electronic identification information for appliances that receive power from the one or more power supply devices, and from structures provided with respective ones of the appliances, the electric power strip is arranged and configured to measure power usage of the appliances and store data that characterizes amounts of power received by particular appliances over a period of time, and the transmitter arranged and configured to send data to a computer remote from the one or more power supply devices at least upon an occurrence of a predetermined event; and
    a computer hub arranged to communicate with the one or more power supply devices to obtain data that identifies electric appliances that receive power from particular ones of the power supply devices and the data that characterizes amounts of power received by particular appliances.

15. The system of claim 14, further comprising:
    one or more near-field communication (NFC) sensors in the one or more power supply devices; and NFC tags in electric plugs of the appliances,
wherein the NFC sensors are positioned so as to sense the NFC tags when the plugs are inserted into the power supply devices to obtain electric power.

16. The system of claim 14, wherein the power supply devices include wireless transceivers arranged to communicate to the hub information about energy usage by appliances connected to respective ones of the power supply devices.

17. The system of claim 14, wherein a first power supply device includes a sensor to identify when an appliance is plugged into the first power supply device, and a controller to trigger reading of identification information from the appliance in response to sensing that the appliance is plugged into the power supply device.

18. The system of claim 14, wherein the hub is programmed to receive control commands from a user and to transmit control signals to the power supply devices in order to allows the user to remotely control electrical power provided to individual ones of the appliances.

19. The system of claim 14, wherein the electric power strips are arranged to plug into electric wall outlets, or assemblies to serve as in-wall electric wall outlets, and that include female electric ports for mating with plugs of the appliances.

20. The system claim 14, further comprising one or more portable computing devices having wireless communication sensors for obtaining electronic identifiers form the appliances, and for communicating to the hub additional identifying information for the appliances received by portable computing devices.

* * * * *